US010598474B1

(12) United States Patent
Petrash

(10) Patent No.: US 10,598,474 B1
(45) Date of Patent: Mar. 24, 2020

(54) DEVICE FOR MEASURING AN AQUATIC BEING

(71) Applicant: Robert Petrash, League City, TX (US)

(72) Inventor: Robert Petrash, League City, TX (US)

(*) Notice: Subject to any disclaimer, the term of this patent is extended or adjusted under 35 U.S.C. 154(b) by 197 days.

(21) Appl. No.: 15/982,220

(22) Filed: May 17, 2018

(51) Int. Cl.
A61B 5/103 (2006.01)
G01B 5/00 (2006.01)
A01K 97/00 (2006.01)
G01B 5/02 (2006.01)
G01B 3/04 (2006.01)
G01B 3/00 (2006.01)

(52) U.S. Cl.
CPC .......... G01B 5/0002 (2013.01); A01K 97/00 (2013.01); G01B 3/002 (2013.01); G01B 3/04 (2013.01); G01B 5/02 (2013.01)

(58) Field of Classification Search
CPC ...................................... A01K 61/90
USPC ............................................. 33/511
See application file for complete search history.

(56) References Cited

U.S. PATENT DOCUMENTS

| 1,474,804 A * | 11/1923 | Tyrrell | G01B 3/04 33/567 |
| 3,259,988 A * | 7/1966 | Lunn | A01K 97/00 33/549 |
| 5,097,617 A | 3/1992 | Craven | |
| 5,339,532 A * | 8/1994 | O'Keefe | A01K 97/00 33/485 |
| 5,526,575 A * | 6/1996 | Hoover | A01K 97/00 33/485 |
| 6,115,932 A * | 9/2000 | Fedora | A01K 97/00 33/758 |
| 6,415,521 B1 * | 7/2002 | Schnell | A01K 97/00 33/485 |
| 7,134,214 B1 * | 11/2006 | Manning | B43L 7/00 33/483 |
| 7,191,536 B1 * | 3/2007 | Bailey | A22C 25/04 33/485 |
| 7,408,125 B2 | 8/2008 | Lentine | |
| 7,665,220 B1 * | 2/2010 | Gee | G01B 1/00 33/511 |
| 2004/0163267 A1 * | 8/2004 | Bini | A01K 97/00 33/511 |
| 2005/0144800 A1 * | 7/2005 | Pieczynski | A01K 97/00 33/511 |
| 2010/0064539 A1 * | 3/2010 | Jacobs | A01K 87/007 33/700 |
| 2011/0192046 A1 * | 8/2011 | Kinziger | A01K 97/00 33/759 |

(Continued)

Primary Examiner — George B Bennett
(74) Attorney, Agent, or Firm — Sanchelima & Associates, P.A.; Christian Sanchelima; Jesus Sanchelima

(57) ABSTRACT

The present invention is a device for measuring an aquatic being. The device comprises a chamber and a semi-circular scale extending from the chamber. The chamber has a viewing window for allowing the user to visually inspect whether the nose of the fish is touching the base of the chamber. Scales are provided on the outer surface of the chamber to facilitate the measurement of the aquatic being placed within the chamber of the device. If the length of the aquatic being is longer than that of the chamber, another scale is provided on an inner surface of the semi-cylindrical scale, which facilitates the measurement of the aquatic being whose length extends beyond that of the chamber.

8 Claims, 2 Drawing Sheets

(56) References Cited

U.S. PATENT DOCUMENTS

2012/0324751 A1* 12/2012 Wakeman ............ G01B 3/1084
33/759
2014/0007443 A1* 1/2014 Orman ................. G01B 3/1084
33/701

* cited by examiner

DEVICE FOR MEASURING AN AQUATIC BEING

BACKGROUND OF THE INVENTION

1. Field of the Invention

The present disclosure relates to a measuring device. More particularly, the present disclosure relates to a measuring device for measuring body dimensions of an aquatic being.

2. Description of the Related Art

Measuring the body parameters of an aquatic being is typically a very tedious task. The aquatic being tends to be excessively mobile, when taken out of its natural environment, i.e., the water body. Due to this, it becomes difficult to obtain the correct measurement of the aquatic being. Hence there is need of a device that facilitates easy and convenient measurement of the body parameters of the aquatic being.

Several designs for devices or apparatus to measure the body parameters of aquatic beings have been designed in the past. None of them, however, have been designed to have a simple and easy to manufacture configuration. Furthermore, none of the known devices facilitate convenient and secure holding of the aquatic being for providing a correct measurement of the aquatic being.

Applicant believes that a related reference corresponds to U.S. Pat. No. 7,408,125 filed by Gregory E. Lentine for a fish scale and length measuring sensor. The Gregory reference discloses a fish length measuring apparatus that incorporates a digital scale allows fishermen to both measure and weigh their catch without touching or handling the fish. However, the apparatus disclosed in the Gregory reference involves hanging the fish onto a scale and then take the required measurements. Therefore, for measuring the length of the fish, the fish needs to be absolutely still. Thus, the apparatus disclosed in the Gregory reference is not suitable for use in recreational fishing or fishing for scientific research, wherein the fish is released back into the water after the measurements are taken. Furthermore, the apparatus disclosed in the Gregory reference involves the use of digital sensors, which makes it costly.

Another related application is U.S. Pat. No. 5,097,617 filed by Gene C. Craven for an apparatus for measuring fish. The Gene reference discloses an elongated, upwardly opening V-shaped trough for measuring fish. However, the Gene reference fails to disclose an apparatus to securely hold the fish while the measurement is being performed.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a device for measuring an aquatic being, which has a simple and easy to manufacture configuration.

It is still another object of the present invention to provide a device for measuring an aquatic being, which can hold the aquatic being securely while the aquatic being is measured.

It is yet another object of the present invention to provide a device for measuring an aquatic being, which does not employ the usage of costly digital components such as sensors and the associated circuitry.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
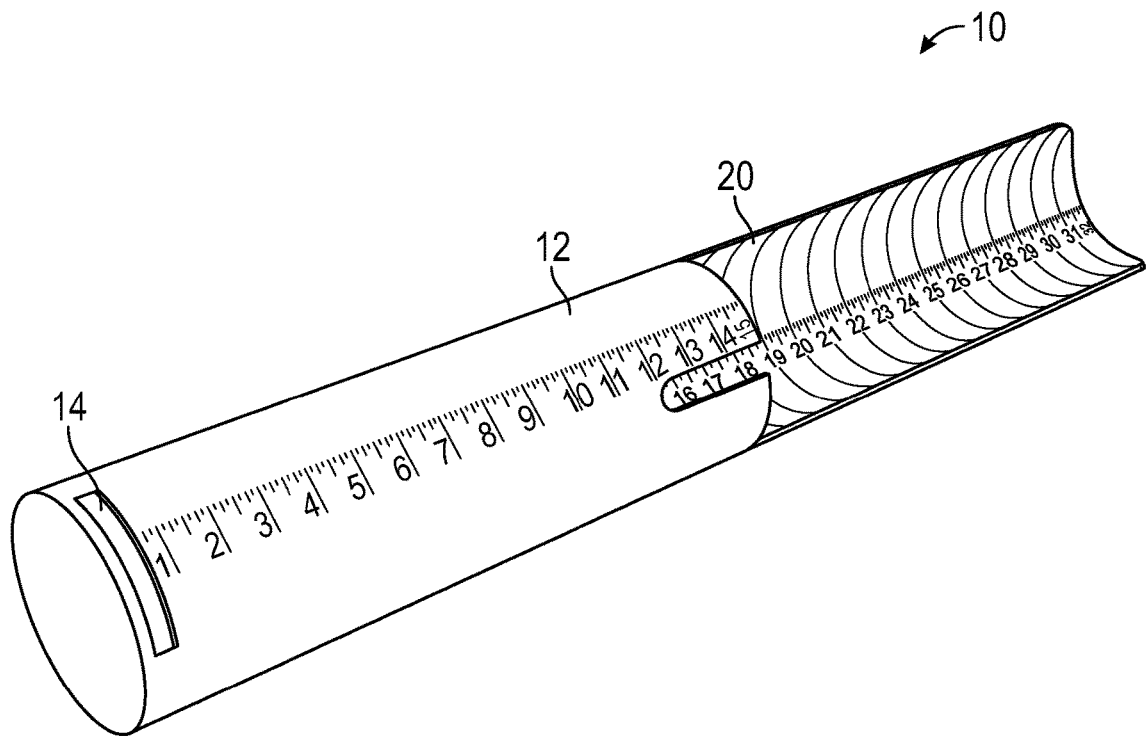
FIG. 1 represents an isometric view of a device for measuring an aquatic being 10, in accordance with one embodiment of the present invention, which comprises a chamber 12 and a semi-cylindrical scale 20 extending from the chamber 20.
Figure 2:
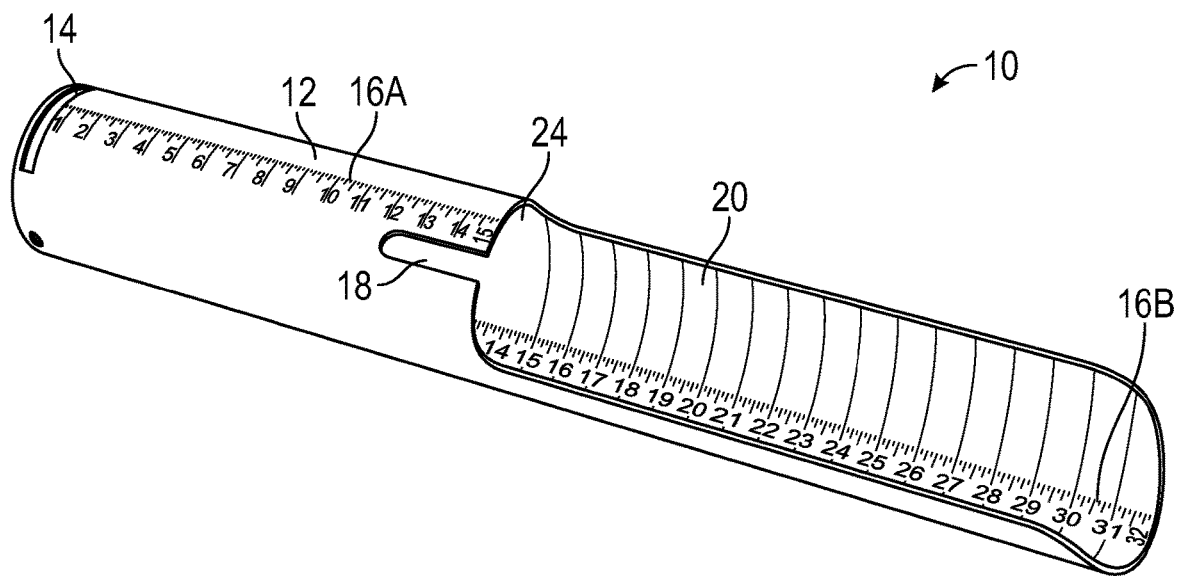
FIG. 2 demonstrates represents another isometric view of the device 10, wherein scales 16A, 16B are provided on the chamber 12 and the semi-cylindrical scale 20 for facilitating the measurement of the aquatic being within the chamber 12.
Figure 3:
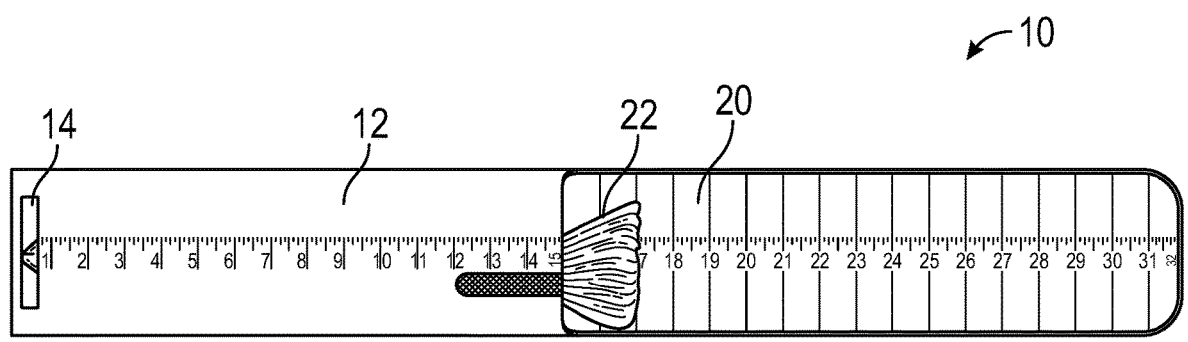
FIG. 3 demonstrates a top view of the device 10, wherein the aquatic being 22 is placed within the chamber 12 for being measured.

FIG. 1, FIG. 2, and FIG. 3 represent different views of the device 10 of the present invention. Referring now to FIGS. 1-3, where the present invention is generally referred to with numeral 10, it can be observed that the device for measuring an aquatic being 10 (interchangeably referred to as device 10), in accordance with one embodiment, comprises a chamber 12 and a semi-cylindrical scale 20 extending from the chamber 12.

In accordance with the present invention, the device 10 can be used for measuring dimensions of an aquatic being. The aquatic being can be any one from the group consisting of fish, shrimp, prawns, lobsters, and the like.

The device 10 comprises a viewing window 14 provided adjacent the closed end of the device 10, which also forms the base of the chamber 12. The viewing window 14 is a transparent section provided on the chamber 12. In another embodiment, the viewing window 14 is a slot having thickness just enough to allow a user to visually confirm whether the nose of the fish is touching the base of the chamber 12.

The device 10 further comprises scales 16A, 16B provided on the chamber 12 and the semi-cylindrical scale 20. The scale 16A facilitates the measuring of the aquatic being 22, when the aquatic being 22 is just long enough to be accommodated within the chamber 12. In case the aquatic being 22 is longer than the chamber 12, the scale 16B provided on the semi-cylindrical scale 20 can be used to obtain the measurement of the aquatic being 22. It should be noted that in such a scenario, the semi-cylindrical scale 20 serves dual purpose, i.e., apart from acting as a scale for measuring the aquatic being 22, the semi-cylindrical scale 20 also functions as a support to hold the aquatic being 22, when the length of the aquatic being 22 exceeds the length of the chamber 12.

The operative configuration of the device 10 is hereinafter described with reference to FIGS. 1-3. For measuring the aquatic being 22, the aquatic being 22 is placed within the chamber 12. This is done manually, where the user holds the aquatic being 22 in their hand and introduce the aquatic being 22 within the chamber 12. The introduction of the aquatic being 22 within the chamber 12 is achieved via an opening 24 formed by the end periphery of the chamber 12 and the curved profile of the semi-cylindrical scale 20. The device 10 further comprises a second viewing slot 18 provided at the operative end of the chamber 12. The second viewing slot 18 facilitates the viewing of the aquatic being 22 from another perspective.

It is to be noted that the device 10 has been depicted in FIGS. 1-3 as having a cylindrical configuration. However, it is to be noted that the shape of the device 10 is not limited to being cylindrical. Other configurations of the device 10, which would facilitate secure holding of the aquatic being 22 therewithin are well within the ambit of the present invention. For example, the device 10 can be any one of a triangular shape, a rectangular shape, or a polygonal shape.

The device 10, insofar described in the present specification with reference to FIGS. 1-3, has been depicted as having a narrow elongate configuration suitable for measuring aquatic beings 22 with elongate body types, e.g., fish, shrimps, and the like. The device 10 can also include a ruler on its back surface.

The device 10 of the present invention cannot be used for measuring aquatic beings having a circular or vertically growing body type, e.g., crabs, turtles, pomfrets, symphysodon, and pterophyllum. However, using the same principle insofar described in the present specification, another embodiment of the device 10 can be configured by providing increased width to the chamber 12. In this embodiment, an additional scale can be provided along a lateral edge of the chamber 12. This would allow the user to gauge the approximate diameter or width of aquatic beings such as crabs, turtles, or fishes like pomfrets, symphysodon, and pterophyllum.

In yet another embodiment, the additional scale can be provided centrally on the external surface of the chamber 12, and the section of the chamber 12 on which the additional scale is provided can be transparent. In yet another embodiment, the entire chamber 12 can be made of a transparent material.

In accordance with the present invention, the device 10 is made up of a heavy duty plastic material. Examples of such material include polyvinyl chloride and the like.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A device for measuring marine life, comprising:
a tubular housing having an upper end and a lower end, said upper end including an outer surface and an inner surface, said lower end including an outer surface and an inner surface, said lower end being substantially enclosed, said upper end being open and having a back wall with an inner surface, said back wall extends out of said lower end a predetermined distance, said lower end having a circular opening adapted to allow a user to insert a fish into said lower end, said upper end inner surface having ruler markings thereon configured to measure said fish, said back wall being curved.

2. The device of claim 1 wherein said upper end and said lower end are integrally mounted to each other.

3. The device of claim 1 wherein said lower end includes a bottom end having a distal end that includes a cap.

4. The device of claim 1 wherein said cap is removable.

5. The device of claim 1 wherein said lower end includes a lower end circumference, a bottom end having a slit extending along a predetermined amount of said lower end circumference.

6. The device of claim 1 wherein said lower end includes a bottom end and a top portion having a top periphery, a viewing slot extending from said top periphery towards said bottom end.

7. The device of claim 1 wherein said lower end outer surface includes ruler markings.

8. The device of claim 1 wherein said lower end inner surface includes ruler markings that continue through said back wall inner surface.

* * * * *